Patented Feb. 13, 1951

2,541,440

UNITED STATES PATENT OFFICE 2,541,440

HARDENABLE BINDING AGENT IN A STABLE AQUEOUS FORM AND PROCESS OF MAKING SAME

Luzius Schibler, Basel, Switzerland, assignor to Ciba Limited, Basel, Switzerland No Drawing. Application July 10, 1946, Serial No. 682,599. In Switzerland July 17, 1945

6 Claims. (Cl. 260—6)

Aqueous binding agents, which yield water-resistant adhesive bonds or coatings when dried at ordinary or a raised temperature, are of considerable technical importance, but it has not been possible hitherto to make preparations which are entirely satisfactory in all respects. The best known and oldest aqueous binding agents consist of solutions of protein substances, especially casein glues, which become water-resistant upon the addition of slaked lime, formaldehyde, chromium salts, tannin or other hardening agents. However, all these mixtures are of limited stability, since the hardening agent begins to act upon the binding agent in the liquid glue before use, so that the mixtures frequently solidify to form irreversible jellies within a few hours. They cannot in any case be put on the market in a condition ready for use, so that it is necessary to utilise the freshly prepared binding agent as rapidly as possible and completely. Attempts have been made to render stable casein glues containing formaldehyde by the addition of urea and other substances capable of reacting with formaldehyde. However, this is not entirely successful, because insoluble and in part crystalline urea-formaldehyde compounds of the type of methylene-urea soon separate out in such mixtures, especially when they have a weakly acid reaction, so that their homogeneity and adhesive power is seriously impaired. If the pH value of such casein glues is adjusted to over 7.0 by the addition of a large quantity of a substance of alkaline reaction, for example, caustic soda solution or ammonia, they no longer produce sufficiently water-resistant effects upon drying and their stability when heated to high temperatures is lost to a very considerable extent.

On the other hand, the binding agents made in accordance with the new process of the present invention have an almost unlimited stability even at pH values below 6.0. They do indeed generally assume a jelly-like consistency upon standing, but upon stirring this disappears in a short time and the original fluid-viscous form returns. The stability arises, however, also from the homogeneity of the binding agent, from which neither solid nor liquid constituents separate upon storage. The new products may have a weakly acid reaction, and owing to this they yield upon drying water-insoluble coatings which can be hardened excellently, for example, by heating, without the action of additional acid.

As starting material for making the new products there is used acid casein, that is to say the protein bodies which separate from skim milk at an acid reaction, and this starting material may be used in the still moist condition or in the dry state. Especially valuable binding agents of high adhesive power, emulsifying capacity and transparency are obtained by using acid casein which has been purified in a known manner, particularly by the process of U. S. Patent 2,372,986. An aqueous glue is first prepared from the casein in the usual manner with the addition of a substance of alkaline reaction, for example, borax, sodium carbonate, caustic soda solution, trisodium phosphate, triethanolamine, guanidine carbonate or the like. To the resulting glue is added a carbamide, which is preferably urea or thiourea, and of which a part may be replaced by a compound containing at least one amino-group and capable of condensing with formaldehyde, the carbon atoms of this compound being linked with their four valencies to three nitrogen atoms, for example, guanidine, dicyandiamide, melamine or the like. The formaldehyde may be added in the form of the usual aqueous solution or in solid form. In all cases there are so obtained relatively thin mixtures which, provided that not too large a quantity of the alkaline digesting agent has been used, have a distinctly acid reaction. This reaction may be stabilised or modified by the addition of a buffer solution. Furthermore, there may be added to the condensing mixture further substances, which enter at least in part into the structure of the resulting resin compounds, for example, water-soluble alcohols.

The reaction mixture is then heated to a high temperature, while stirring, until a highly viscous transparent mass is obtained, which has a strong tendency to gel formation, especially upon cooling.

Further heating of the reaction product would lead to water-insoluble condensates. However, in the process of the invention the reaction is discontinued at this stage by dilution with water and immediately cooling the well stirred mass to ordinary temperature. By the addition of water the casein content of the reaction mixture falls from the original value of advantageously over 10 per cent. to less than 10 per cent., and it is surprising that the generally still highly viscous systems which now exist are entirely stable in spite of their acid reaction.

It is known that casein is capable of forming mixed colloids with carbamides, for example, ureas or thiourea, and formaldehyde under suitable conditions. By allowing these components to react with one another for a long time at ordinary temperature there is formed a mixture of a protein sol with mono- and di-methylol-urea, which passes into the colloidal state only to a small extent. The present process differs from the foregoing process in that the former is carried out at a raised temperature, whereby highly colloidal mixtures are obtained relatively rapidly which have a far higher degree of condensation. Condensates from casein, carbamides and formaldehyde have previously been produced by heating. However, this was exclusively for the purpose of producing plastic masses, and it could not be learned from that process that stable binding agents capable of being stored would be produced from the resulting mixed colloids by observing special conditions, that is to say, by dilution at a certain stage of the condensation.

The new binding agents may with advantage be combined with other adhesive or binding substances, for example, with ordinary reversible casein glues or with other water-soluble synthetic resins, polymerisates, cellulose esters, starch or dextrin, and further with softening agents, filling materials or pigments of all kinds. It has proved to be of special advantage to emulsify the new products with oily constituents, for example, lacquers, drying oils, oil-soluble synthetic resins, rubber or derivatives thereof, waxes, paraffin wax or the like. The new binding agents may serve as the inner or outer phase of the emulsion. As they themselves possess a considerable emulsifying action, it is possible in many cases to work without added emulsifying agents, so that such binding agents in the form of emulsions yield upon drying especially valuable water-resistant coatings, etc.

The new products can be used with advantage for a very wide range of application, for example, in the paper, wood, leather and textile industries, in paint manufacture, in combating pests, etc. For example, the new binding agents are suitable for fixing pigments on fibrous materials, especially textiles. Very useful printing colors, which do not impart stiffness to the fabric, are obtained by emulsifying the binding agents of the invention with organic solvents immiscible with water.

The following examples illustrate the invention, the parts being by weight:

*Example 1*

40 parts of acid casein are dissolved in 197 parts of water with the addition of 3 parts of triethanolamine and 40 parts of urea. 120 parts of a formaldehyde solution of 36.5 per cent. strength are added to the resulting casein solution, and the mixture is heated to 90° C., while stirring. After about 40 minutes a thick gel is formed, which latter is immediately diluted with 100–200 parts of water, cooled, and stirred. There is obtained a stable binding agent of a jelly-like to fluid-viscous consistency which, owing to its pH value of 4.76, dries at ordinary temperature to form a water-insoluble film.

*Example 2*

To 60 parts of a purified and clarified casein solution containing 15 parts of casein, 12 parts of thiourea, 2 parts of trisodium phosphate and 31 parts of water, and obtained as described in Example 5 of U. S. Patent 2,372,986 are added 33 parts of water, 12 parts of a buffer solution and 30 parts of formaldehyde solution of 36.5 per cent. strength. The mass which at first coagulates soon liquefies to form a thin solution. The latter is heated for 12 hours at 85–90° C., whereby it gradually thickens without directly forming a gel. The highly colloidal mass is finally diluted with 65 parts of water, and a weakly viscous binding agent of a milky white appearance is obtained, which nevertheless dries to give a glass-clear film. The pH value is 5.39, but in spite of this neither flocculation nor gel formation occurs during storage.

*Example 3*

As starting material there is used a clarified casein solution, which is to a far-reaching extent free from lactalbumen and has been obtained in the manner described in Example 4 of U. S. Patent 2,372,986. This product contains about 24 per cent. of acid casein, 3 per cent. of borax, 20 per cent. or urea and 4 per cent. of thiourea. 300 parts of the solution are mixed with 210 parts of a formaldehyde solution of 36.5 per cent. strength, 30 parts of glycol and 80 parts of a solution of sodium citrate of 5 per cent. strength having a pH value of 5.50. The thin and only slightly turbid liquid is then heated on a boiling water bath while stirring until after an initial gradual thickening gel formation occurs almost suddenly, which requires about 3½ hours. The whole is then immediately mixed with 380 parts of ice, and the gel is stirred to form a homogeneous, transparent and tough, viscous mass. The latter is stable for more than one year, and assumes upon standing a slightly gel structure, which disappears after stirring or agitating for a short time and returns to the original fluid consistency. The binding agent has a pronounced capacity for emulsifying oily constituents of all kinds. The film formed therewith upon drying is glass-clear and insoluble, and hardens excellently under the action of heat.

*Example 4*

80 parts of acid casein, 72 parts of urea and 20 parts of dicyandiamide are dissolved in 104 parts of water with the addition of 4 parts of guanidine carbonate. The resulting solution is mixed with 280 parts of formaldehyde solution of 36.5 per cent. strength and heated to 80–90° C. After 2½ hours a tough gel is formed, which is stirred with 440 parts of water to form a tough, viscous mass and is simultaneously cooled to room temperature. The binding agent, which is stable in this form, contains 8 per cent. of casein and has a pH value of 5.67. It can be further diluted as desired but when once dried it can no longer be brought into solution with water.

*Example 5*

There are dissolved, on the one hand, in 330 parts of water, 200 parts of purified acid casein obtained as described in Example 3 of U. S. Patent 2,372,986, 20 parts of borax, 160 parts of urea and 40 parts of thiourea with the addition of 50 parts of cyclohexanol, and on the other hand, in 700 parts of formaldehyde solution of 36.5 per cent. strength 50 parts of melamine. These two solutions are heated together at 60–70° C. with the addition of 450 parts of citrate solution of 2 per cent. strength having a pH value of 5.5. After 3 hours the initially thinly fluid mixture passes into a gel. The latter is immediately stirred with 1800–2000 parts of water to produce a homogeneous, tough mass, which upon prolonged standing assumes a slightly jelly-like structure. Upon being agitated or stirred the product liquefies to the original consistency. In spite of its pH value of 5.58, which imparts to the adhesive bonds obtained with the binding agent an excellent capacity for hardening and resistance to water, the product remains stable for more than one year.

What I claim is:

1. A process for producing a hardenable aqueous binding agent, stable at a pH-value of below 6.0, by heating an aqueous solution having a pH-value below 6.0 and containing formaldehyde, about 10–14.28 per cent. by weight of acid casein and approximately the same amount of a carbamide, capable of forming hardenable aminoplastics with formaldehyde, selected from the group consisting of urea, thiourea, mixture of urea and thiourea, mixture of urea and thiourea and an iminourea compound containing at the most three times the group $$-NH-C=N-$$

mixture of urea and the said iminourea compound, and mixture of thiourea and the said iminourea compound, until gel formation takes place and, in this condition, interrupting the condensation by diluting and cooling the mixture with water until the casein content of the end product is 8 to 5 per cent. by weight.

2. A process according to claim 1, wherein the acid casein is a purified albumin-free acid casein.

3. A process according to claim 1, wherein a buffer solution is added to the binding agent.

4. A hardenable aqueous binding agent, stable at a pH-value of below 6.0, comprising a colloidal mixed condensate obtained by heating an aqueous solution having a pH-value below 6.0 and containing formaldehyde, about 10–14.28 per cent. by weight of acid casein and approximately the same amount of a carbamide, capable of forming hardenable aminoplastics with formaldehyde, selected from the group consisting of urea, thiourea, mixture of urea and thiourea, mixture of urea and thiourea and an iminourea compound containing at the most three times the group $$-NH-C=N-$$

mixture of urea and the said iminourea compound, and mixture of thiourea and the said iminourea compound, until gel formation takes place and, in this condition, interrupting the condensation by diluting and cooling the mixture with water until the casein content of the end product is 8 to 5 per cent. by weight.

5. A hardenable binding agent according to claim 4, wherein the acid casein is a purified albumin-free acid casein.

6. A hardenable binding agent according to claim 4, to which a buffer solution has been added.

LUZIUS SCHIBLER.

REFERENCES CITED

The following references are of record in the file of this patent:

UNITED STATES PATENTS

| Number | Name | Date |
|---|---|---|
| 2,033,718 | Kraus | Mar. 10, 1936 |
| 2,133,335 | Wilson et al. | Oct. 18, 1938 |
| 2,169,392 | Powers | Aug. 15, 1939 |
| 2,262,770 | La Piana | Nov. 18, 1941 |
| 2,272,352 | Ripper | Feb. 10, 1942 |
| 2,304,600 | Scheuermann | Dec. 8, 1942 |
| 2,331,926 | Olin | Oct. 19, 1943 |
| 2,332,519 | Leonardson | Oct. 26, 1943 |
| 2,361,277 | Enderlin et al. | Oct. 24, 1944 |
| 2,372,986 | Schibler | Apr. 3, 1945 |

FOREIGN PATENTS

| Number | Country | Date |
|---|---|---|
| 537,813 | Great Britain | July 8, 1941 |